April 28, 1970  ZENJI KUSUDA ET AL  3,508,605
TEMPERATURE CONTROL SYSTEM FOR ELECTRIC REFRIGERATOR
Filed Aug. 27, 1968                                    2 Sheets-Sheet 1

INVENTORS
ZENJI KUSUDA,
TAKEJI KOBAYASHI
BY
ATTORNEYS

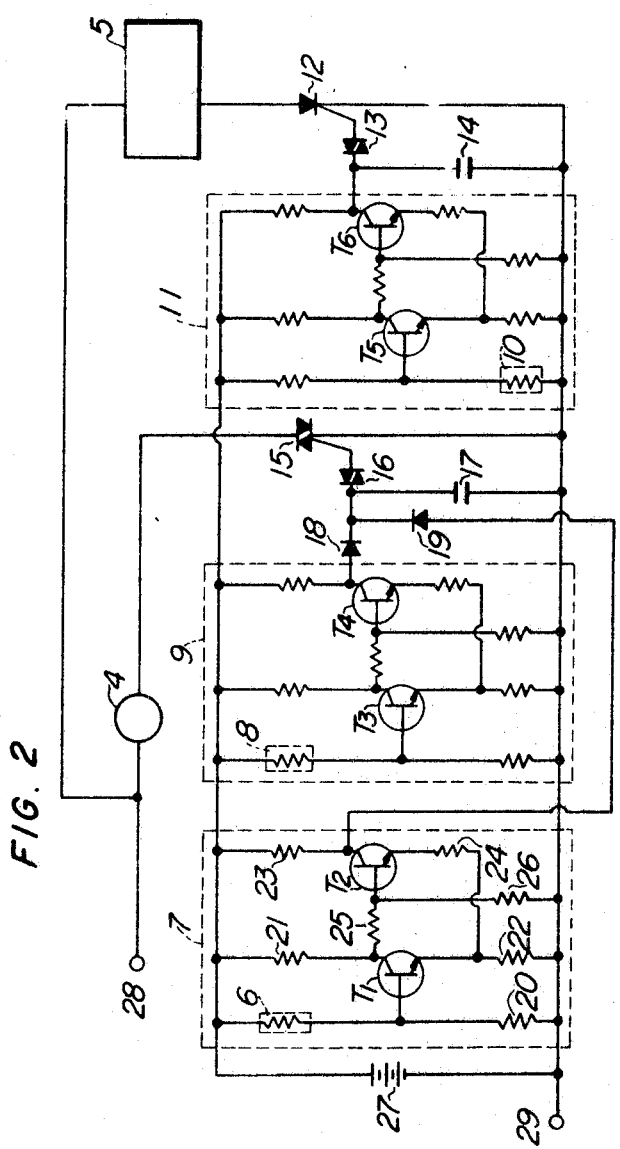

United States Patent Office 3,508,605
Patented Apr. 28, 1970

3,508,605
TEMPERATURE CONTROL SYSTEM FOR
ELECTRIC REFRIGERATOR
Zenji Kusuda, Ibaragi-shi, and Takeji Kobayashi, Kyoto,
 Japan, assignors to Matsushita Electronics Corporation,
 Osaka, Japan, a corporation of Japan
Filed Aug. 27, 1968, Ser. No. 755,692
Claims priority, application Japan, Aug. 31, 1967,
42/56,275
Int. Cl. F25b 29/00
U.S. Cl. 165—30                                    3 Claims

ABSTRACT OF THE DISCLOSURE

Temperature control system for electric refrigerators; in which the compressor motor is controlled according to signals from two temperature detecting circuits which detect the temperature in the freezing compartment and the provisional compartment respectively, and an electric heater placed in the provisional compartment for compensating an excessively low temperature is controlled by a signal from another temperature detecting circuit which detects the temperature in the provisional compartment.

---

Figure 1:
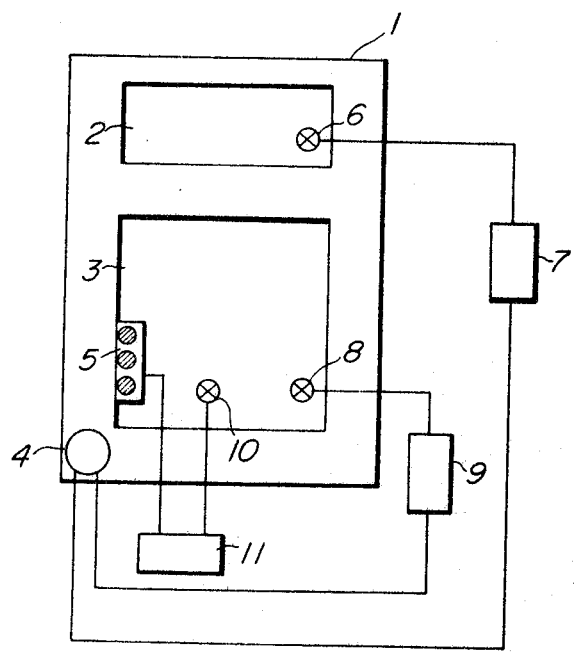

This invention relates to a temperature control system for electric refrigerators which is constituted so as to be able to independently control the respective temperature in the freezing compartment and the provisional compartment of the refrigerator.

Generally speaking, the interior of an electric refrigerator is separated into two compartments, that is, a freezing compartment and a provisional compartment. In conventional temperature control systems, the temperature has been controlled exclusively with reference to a temperature detector placed in the freezing compartment. With such a control system, the control of temperature within the provisional compartment has not been satisfactory, since said temperature is greatly affected by the frequency of opening the door and by the room temperature.

On the other hand, the recent tendency of increased use of frozen food in kitchens has raised the demand for assured low temperature in the freezing compartment. With a conventional temperature control system, however, if the temperature in freezing compartment is extremely lowered, the temperature in the provisional compartment will be lowered accordingly, thus freezing general provisions stored in the latter compartment.

The above-mentioned problem has been solved by the present invention according to which the respective temperature in the freezing compartment and the provisional compartment are independently controlled.

Therefore, an object of the present invention is to provide a temperature control system for electric refrigerators having a freezing compartment and a provisional compartment characterized in that said control system comprises a compressor motor and a first thyristor connected in series between power source terminals, a heater and a second thyristor connected in series between said power source terminals, a first temperature detecting circuit responding to a temperature in the freezing compartment, a second temperature detecting circuit responding to a temperature in the provisional compartment, a third temperature detecting circuit responding to a temperature in the provisional compartment in the opposite manner to that of said first and second temperature detecting circuits, and a first and second trigger means respectively for triggering said first and second thyristors; and that said first and second temperature detecting circuits are connected to said first trigger means respectively through a diode, and said third temperature detecting circuit is connected to said second trigger means.

Other objects and features of the present invention will become clear in the following description given in connection with an embodiment of the present invention and referring to the attached drawings in which;

FIG. 1 is a schematic diagram of an electric refrigerator provided with the temperature control system of the present invention; and FIG. 2 is a wiring diagram of an embodiment of the present invention.

Referring to FIG. 1, the interior of the electric refrigerator 1 is separated into two sections, that is, a freezing compartment 2 and a provisional compartment 3. Reference numeral 4 indicates a compressor motor for compressing the refrigerant, for example, Freon, and numeral 5 indicates a heater for preventing the provisional compartment 3 from being excessively cooled. Said compressor motor 4 is driven under the control of two signals, one from a first temperature detecting circuit 7 associated with thermistor 6 placed in the freezing compartment 2 for detection of the temperature therein and the other from a second temperature detecting circuit 9 associated with thermistor 8 placed in the provisional compartment 3.

Said heater 5 operates to prevent the provisional compartment 3 from being excessively cooled, under the control of a signal from a third temperature detecting circuit 11 associated with thermistor 10 placed in the provisional compartment 3.

With the temperature control system including the abovementioned three temperature detecting circuits, the temperature in the freezing compartment and the provisional compartment are respectively controlled in such a manner as will be described hereunder.

When the temperature in the provisional compartment rises as a result of frequent opening of the door while the temperature in the freezing compartment remains at a freezing temperature, the compressor motor 4 is driven according to the function of the second temperature detecting circuit 9 to increasedly freeze the freezing compartment and thereby to lower the temperature in the provisional compartment. On the contrary, when the freezing operation continues because of a rise in temperature in the freezing compartment while the provisional compartment is at an optimum temperature and there is a danger that the temperature in the provisional compartment becomes so low that the provisions stored in said compartment are frozen, then said heater 5 operates according to the function of the third temperature detecting circuit 11 to heat the provisional compartment and thereby to prevent the stored provisions from being frozen.

Further, if the refrigerator were only provided with the second temperature detecting circuit 9 as a temperature control means, the cooling operation would stop when the refrigerator was installed in an atmosphere lower than the pre-set temperature of the provisional compartment, thus making null the freezing ability of the freezing compartment. According to the present invention, however, the compressor motor 4 continues to operate under the control of the first temperature detecting circuit 7 even in the above-mentioned circumstance, thus ensuring perfect freezing ability of the refrigerator.

FIG. 2 shows a tangible example of the electric circuit employed in the temperature control system of the present invention as described heretofore.

As is obvious in FIG. 2, the motor 4 for compressing the refrigerant is connected to terminals 28 and 29 of the commercial power source through the first thyristor 15, and the heater 5 for preventing the provisional compartment from being excessively cooled is connected through the second thyristor 12 to said series-connected circuit including the motor 4 and the first thyristor 15.

Said first thyristor 15 is selectively switched between a conductive state and a non-conductive state by a gate trigger means consisting of a charge-up capacitor 17 and a bilateral switching element or a voltage dependent conductive element 16 having a negative resistivity. Said gate trigger means in turn operates under the control of the first and second temperature detecting circuits 7 and 9 each of which consists of a Schmitt circuit including two transistors, a thermistor and several resistors. Further, outputs of said temperature detecting circuits 7 and 9 are applied to said gate trigger means through an OR-gate circuit consisting of diodes 18 and 19.

Similarly, said second thyristor 12 is switched between a conductive state and a non-conductive state by another gate trigger means consisting of a charge-up capacitor 14 and a bilateral switching element or a voltage dependent conductive element 13 having a negative resistivity; and this gate trigger means operates under the control of the third temperature detecting circuit 11 which responds to a change in the temperature in the opposite manner to that of said first and second temperature detecting circiuts 7 and 9.

In FIG. 2, reference numerals 21 and 23 indicate collector resistors respectively of transistors $T_1$ and $T_2$, numerals 22 and 24 emitter resistors of the same transistors, and numerals 25 and 26 voltage dividing resistors for defining the bias voltage for the base of the transistor $T_2$.

In an electric refrigerator which is provided with three sets of temperature detecting circuits as described above, if the temperature in the freezing compartment is higher than the predetermined freezing temperature while the temperature in the provisional compartment remains at an optimum temperature, the compressor motor 4 is driven under the control of the first temperature detecting circuit 7 which detects the change in temperature of the freezing compartment. That is, a rise in temperature in the freezing compartment decreases the resistance of the thermistor 6 placed therein, thus raising the base bias voltage of the transistor $T_1$ which is determined by the ratio of values of the thermistor 6 and the resistor 20, and resulting in conduction of the transistor $T_1$. Whereupon, the base bias voltage of the transistor $T_2$ drops to bring the transistor $T_2$ to a non-conductive state. Accordingly, the capacitor 17 is charged through the resistor 23 and the diode 19 until the bilateral switching element 16 is turned conductive, which in turn triggers the thyristor 15 to a conductive state. Therefore, the compressor motor 4 is driven to carry on the refrigerating operation.

Meanwhile, as the second temperature detecting circuit 9 is detecting the optimum state of the provisional compartment by means of the thermistor 8 placed therein, the transistor $T_3$ is not conducting but the transistor $T_4$ is conducting. Thus, the second temperature detecting circuit 9 is not in a state to actuate the gate trigger means.

Further, the third temperature detecting circuit 11 will not actuate the trigger means for the thyristor 12, so far as the temperature in the provisional compartment is in an optimum range. Accordingly, the heater will not be energized.

Control operation in case of insufficient temperature in the freezer with the provisional compartment at optimum temperature has been described in the preceding paragraphs. Next, the control operation performed if the temperature in the provisional compartment becomes higher than a predetermined optimum value because of frequent opening of the door while the temperature in the freezing compartment is sufficiently low for stored frozen foods and there is no need for further freezing operation, will be explained hereafter. In this case, operation of each of the first and second temperature detecting circuits 7 and 9 is similar respectively to the above-described operation of the other circuit of the two, and the capacitor 17 is charged through the collector resistor of the transistor $T_4$ and the diode 18 until the bilateral switching element 16 is turned conductive, which in turn triggers the thyristor 15 to a conductive state. Therefore, the compressor motor 4 is driven to lower the temperature in the provisional compartment to the optimum value. When the temperature in the provisional compartment becomes the optimum value and if the freezing compartment remains at freezer temperature, the transistors $T_2$ and $T_4$ of the first and second temperature detecting circuits 7 and 9, are turned conductive to prevent the capacitor 17 from being charged, thus stopping the compressor motor 4.

As stated previously, the heater 5 is energized only when the provisional compartment has been cooled to a temperature lower than the pre-set optimum temperature. At such a time, resistance of the thermistor 10 incorporated with the third temperature detecting circuit 11 increases to turn the transistor $T_5$ conductive and accordingly the transistor $T_6$ non-conductive. Therefore, capacitor 14 is charged through the collector resistor of the transistor $T_6$. When the voltage across the capacitor 14 reaches the discharge voltage of bilateral switching element 13, said switching element 13 is turned conductive to trigger the thyristor 12 to a conductive state. Thus, the heater 5 is energized to prevent the provisional compartment from being excessively cooled.

As described heretofore, in an electric refrigerator equipped with the temperature control system of this invention, in which the respective temperature in the freezing and provisional compartments are independently controlled, the temperature in each compartment can be kept at a value suitable for preserving frozen food or ordinary food respectively, without danger of freezing the ordinary food or deterioration of the frozen food. Further, the use of a Schmitt circuit associated with a thermistor as the temperature detecting means, ensures high sensitivity and quick response and accordingly greatly improved accuracy of control.

What we claim is:

1. A temperature control system for electric refrigerators having a freezing compartment and a provisional compartment characterized in that said control system comprises a compressor motor and a first thyristor connected in series between power source terminals, a heater and a second thristor connected in series between said power source terminals, a first temperature detecting circuit responding to a temperature in the freezing compartment, a second temperature detecting circuit responding to a temperature in the provisional compartment, a third temperature detecting circuit responding to a temperature in the provisional compartment in the opposite manner to that of said first and second temperature detecting circuits, and a first and second trigger means respectively for triggering said first and second thyristors; and that said first and second temperature detecting circuits are connected to said first trigger means respectively through a diode, and said third temperature detecting circuit is connected to said second trigger means.

2. A temperature control system for electric refrigerators as defined in claim 1, wherein said first, second and third temperature detecting circuits respectively consist of a Schmitt circuit including a thermistor, resistors and transistors.

3. A temperature control system for electric refrigerators as defined in claim 1, wherein said first and second trigger means respectively consist of a capacitor and a voltage dependent conductive element having negative characteristics of resistivity.

References Cited

UNITED STATES PATENTS

| | | | |
|---|---|---|---|
| 2,724,576 | 11/1955 | Jacobs | 165—30 |
| 2,724,577 | 11/1955 | Murphy | 165—30 |
| 2,780,441 | 2/1957 | Rhodes | 165—30 |
| 3,248,892 | 5/1966 | Sutton | 62—156 |

MEYER PERLIN, Primary Examiner

U.S. Cl. X.R.

62—159, 208, 227